(12) United States Patent
Evans (10) Patent No.: US 6,264,017 B1
(45) Date of Patent: Jul. 24, 2001

(54) MULTI-CONDUCTOR POWER BAR SYSTEM AND TROLLEY THEREFOR

(75) Inventor: Maurice Evans, Portage, MI (US)

(73) Assignee: Woodhead Industries, Inc., Deerfield, IL (US)

( * ) Notice: Subject to any disclaimer, the term of this patent is extended or adjusted under 35 U.S.C. 154(b) by 0 days.

(21) Appl. No.: 09/344,890

(22) Filed: Jun. 25, 1999

(51) Int. Cl.$^7$ .................................................. B60M 1/12
(52) U.S. Cl. .................. 191/23 A; 191/23 R; 191/25; 191/45 R; 191/33 R; 104/93
(58) Field of Search .................................. 191/23 R, 25, 191/23 A, 45 R, 48, 49, 45 A, 33 R; 104/89, 94, 95; 105/148, 154, 155

(56) References Cited

U.S. PATENT DOCUMENTS

| Re. 19,513 | * | 4/1935 | Frank et al. | 191/23 R |
| 2,626,301 | * | 1/1953 | Hammerly | 191/22 R |
| 2,961,499 | * | 11/1960 | Mageoch | 191/23 |
| 3,206,560 | * | 9/1965 | Parmenter | 191/45 |
| 3,546,367 | * | 12/1970 | Hart et al. | 174/99 |
| 4,109,768 | * | 8/1978 | Fromme et al. | 191/22 R |
| 5,449,056 | * | 9/1995 | Ross | 191/6 |
| 6,105,741 | * | 8/2000 | Ross | 191/23 A |

FOREIGN PATENT DOCUMENTS

| 2549598 | * | 5/1977 | (DE) | 191/22 R |
| 29602589U1 | * | 5/1996 | (DE) | H01R/25/14 |

OTHER PUBLICATIONS

Aero–Motive Company brochure, entitled "Mobile Electrification Pow–R–Feed," PF93 TMS/6–98, pp. 1–24.

* cited by examiner

Primary Examiner—S. Joseph Morano
Assistant Examiner—Frantz F. Jules
(74) Attorney, Agent, or Firm—Emrich & Dithmar (57) ABSTRACT

An elongated housing in the general shape of an inverted "U" having a lengthwise slot in a lower portion which includes six inner elongated conductor strips. Disposed within the housing and extending through the lower slot is a trolley with four sets of three conductive contact brushes each in linear alignment, with each set of three conductive contact brushes engaging one of four input power conductor strips. The trolley includes two additional brushes each in contact with a respective control conductor strip in the housing. The trolley is coupled to and controls the operation of a mobile machine such as used in automatic storage/retrieval systems. Springs urge the conductive contact brushes into intimate contact with a conductor strip, while support wheels on the trolley engage a lower, inner portion of the elongated housing for distributing the load and providing smooth passage over expansion joints or through transfer guides. Upper guide wheels on the trolley engage an upper, inner portion of the housing to prevent lifting of the trolley during acceleration, while side guide wheels prevent trolley misalignment, reduce wear between the trolley and the housing, and ensure even contact brush pressure distribution. Each set of three contact brushes is connected to a common copper bus bar which terminates in a junction box mounted on the bottom of the trolley, providing one connection point for one single conductor wire per conductor strip.

22 Claims, 5 Drawing Sheets

MULTI-CONDUCTOR POWER BAR SYSTEM AND TROLLEY THEREFOR

FIELD OF THE INVENTION

This invention relates generally to automatic storage and retrieval systems and is particularly directed to a continuous contact, fully enclosed, multi-conductor material transport system and a trolley for use therein.

BACKGROUND OF THE INVENTION

Material transport systems such as automatic storage/retrieval systems (AS/RS) are commonly used in business and industry. These transport systems can take on various forms, with one common approach employing a mobile machine such as an overhead hoist or crane which is supported by and displaced along one or more tracks. The mobile machine is powered and controlled by means of a connected trolley which is also attached to a support structure and moves with the machine in a direction parallel to the tracks supporting the machine. In the case of a crane, electric power and control inputs are provided to the mobile trolley via floor mounted rails, with an overhead rail provided to stabilize the machine. The crane typically operates in a narrow aisle which is very high, i.e., generally on the order of 90 feet in height.

The typical trolley support structure includes an elongated, generally closed housing which is open at the bottom. Disposed within the housing are thin, elongated copper conductor strips which carry electrical power and control signals. An upper portion of the trolley is disposed within the housing and includes conductive contact brushes which engage the conductor strips and transmit power and control signals. Suitable wire connections couple a lower portion of the trolley, which extends through the lower open portion of the support housing, to the mobile machine such as a hoist or crane. The mobile machine is also mechanically connected to the trolley so that the trolley moves with the machine as it is displaced along its support track.

Material transport systems employing multi-conductor strips in a generally closed housing as described above offer various advantages over more conventional single conductor strip systems. These advantages include reduced space requirements, isolation of the electrically active conductors from personnel, and more reliable electrical contact. The copper conductor strips employed in some of these prior transport systems have joints at close intervals. These joints cause excessive brush wear, arcing and poor electrical contact at high trolley speeds.

As this enclosed type of material transport system has gained wider acceptance, there has been an increasing demand for higher current capacities, increased transport speeds, and the incorporation of power and control conductors within the same compact housing. Reducing the size of the conductor housing makes it more difficult to employ large contact brushes on the trolley while maintaining acceptable separation between the various circuit components. In addition, the continuous copper conductor strips necessary to maintain good electrical contact at high trolley speeds are not perfectly flat over long distances. The typical continuous copper conductor has a slightly wavy outer surface over extended distances because of the thin profile of the conductor and the required loose fit of the conductor in the retaining slots within the housing. A contact brush having a long profile spanning the wavy irregularities in the surface of the conductor strip provides a reduced contact surface with the conductor strip, resulting in a reduction in current capacity.

In an effort to increase current capacity, some trolley systems employ conductor strips of increased thickness. Other approaches use multiple pick-up trolleys with their electrical leads connected in parallel. To achieve a continuous current of 100 amps, it is often necessary to connect four trolleys in parallel, or to connect as many as eight trolleys in parallel to provide 200 amps continuously which has become a common requirement. Connecting trolleys in this manner to increase current capacity is expensive, bulky, and inconvenient. In addition, the parallel connection of eight wires per conductor strip is subject to wiring error as well as overheating due to partial loss of contact.

The present invention addresses the aforementioned limitations of the prior art by providing a multi-conductor power bar system wherein conductor strips carrying input power and in some cases also control signals are disposed within an elongated, generally closed housing from which a trolley is suspended. The trolley employs multiple aligned conductor contact brushes for each power conductor strip and incorporates additional contact brushes for engaging the control signal conductor strips, where these are provided. The trolley includes various roller combinations for facilitating smooth transit of the trolley over joints in the housing at high speeds, while also preventing the trolley from lifting during acceleration and maintaining lateral alignment of the trolley within the housing.

OBJECTS AND SUMMARY OF THE INVENTION

Accordingly, it is an object of the present invention to provide a conductor bar arrangement for use in automatic storage/retrieval systems and a trolley therefor, which is compact and includes multiple power conductors and, in some cases, control conductors for displacing a mobile machine connected to the trolley along a support track.

It is another object of the present invention to provide an improved trolley for use in a multi-conductor transport system which employs multiple, aligned, spring-loaded contact brush arrays for engaging a thin, elongated conductor disposed in a closed elongated housing.

Yet another object of the present invention is to provide a high current trolley attached to and suspended from an elongated, generally closed housing incorporating flexible copper conductive strips for displacing track-mounted mobile equipment.

A further object of the present invention is to provide a conductive trolley arrangement for use with an elongated, slotted housing incorporating current-bearing conductors which maintains the trolley aligned with the housing, allows for large current flow between the conductors and trolley even at high speeds, and reduces wear between the housing and trolley, particularly wear of the trolley's conductive contact brushes.

This invention contemplates a multi-conductor power bar system for operating a mobile machine disposed on at least one support track, the system comprising: an elongated, generally closed housing having a slot extending the length thereof; a first plurality of thin power conductor strips disposed within and extending the length of the housing and carrying electric power; a trolley disposed in the housing and extending through the lower slot therein, the trolley including a first plurality of power contact brushes engaging the power conductor strips, wherein the power contact brushes are arranged in a plurality of linearly aligned arrays, and wherein the power contact brushes in each of the linearly aligned arrays engage a respective power conductor strip along a portion of the length thereof; and first power leads each coupling a linearly aligned array of power contact brushes to the mobile machine.

This invention further contemplates a trolley for use in a multi-conductor power bar system for operating a mobile machine mounted to and supported by a track, the power bar system including a first plurality of power conductor strips disposed in a generally closed, elongated housing, wherein the housing includes a slot disposed in a lower portion and extending the length thereof, the trolley comprising a body having an upper portion disposed in the housing and a lower portion extending through the slot in the housing; plural roller means disposed on the upper portion of said body and engaging lower, upper and lateral inner portions of the housing for supporting the trolley, preventing lifting of the trolley within the housing when the trolley is accelerated, and maintaining the trolley laterally aligned with the housing; a first plurality of power brushes disposed on the upper portion of the body and engaging respective power conductor strips; and a first plurality of power leads coupling the power brushes to the mobile machine.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
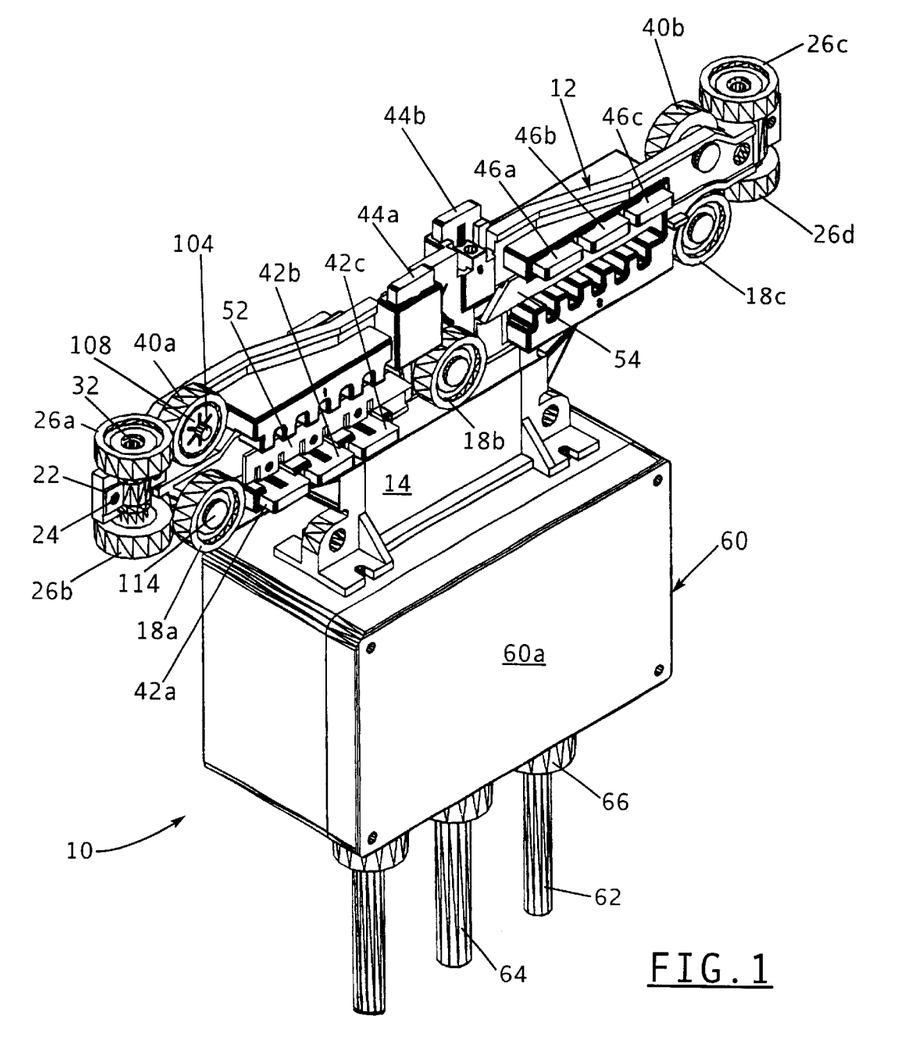
FIG. 1 is an upper perspective view of a trolley for use in a multi-conductor power bar system in accordance with the principles of the present invention.
Figure 3:
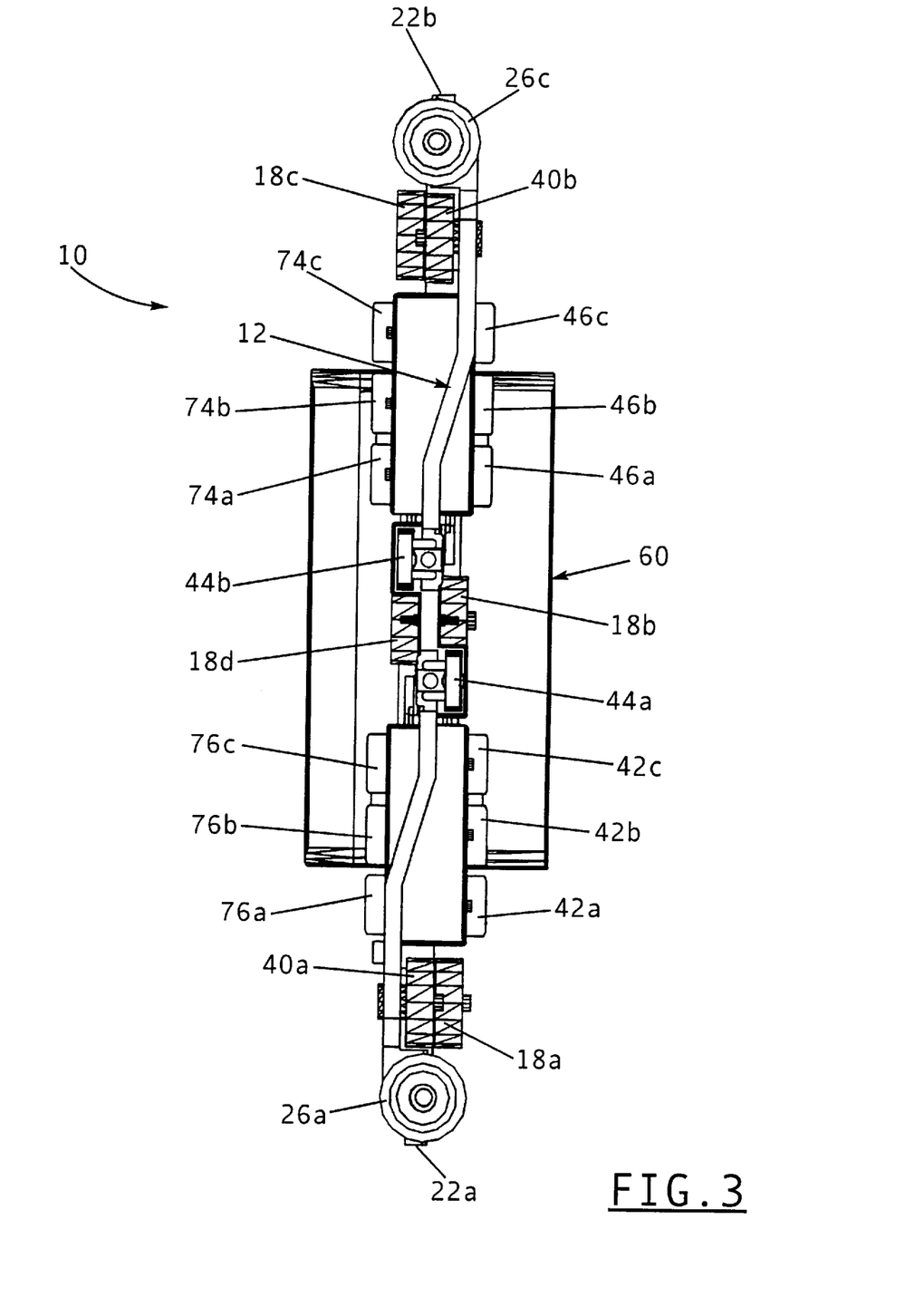
FIG. 3 is a top plane view of the inventive trolley illustrated in FIGS. 1 and 2.
Figure 4:
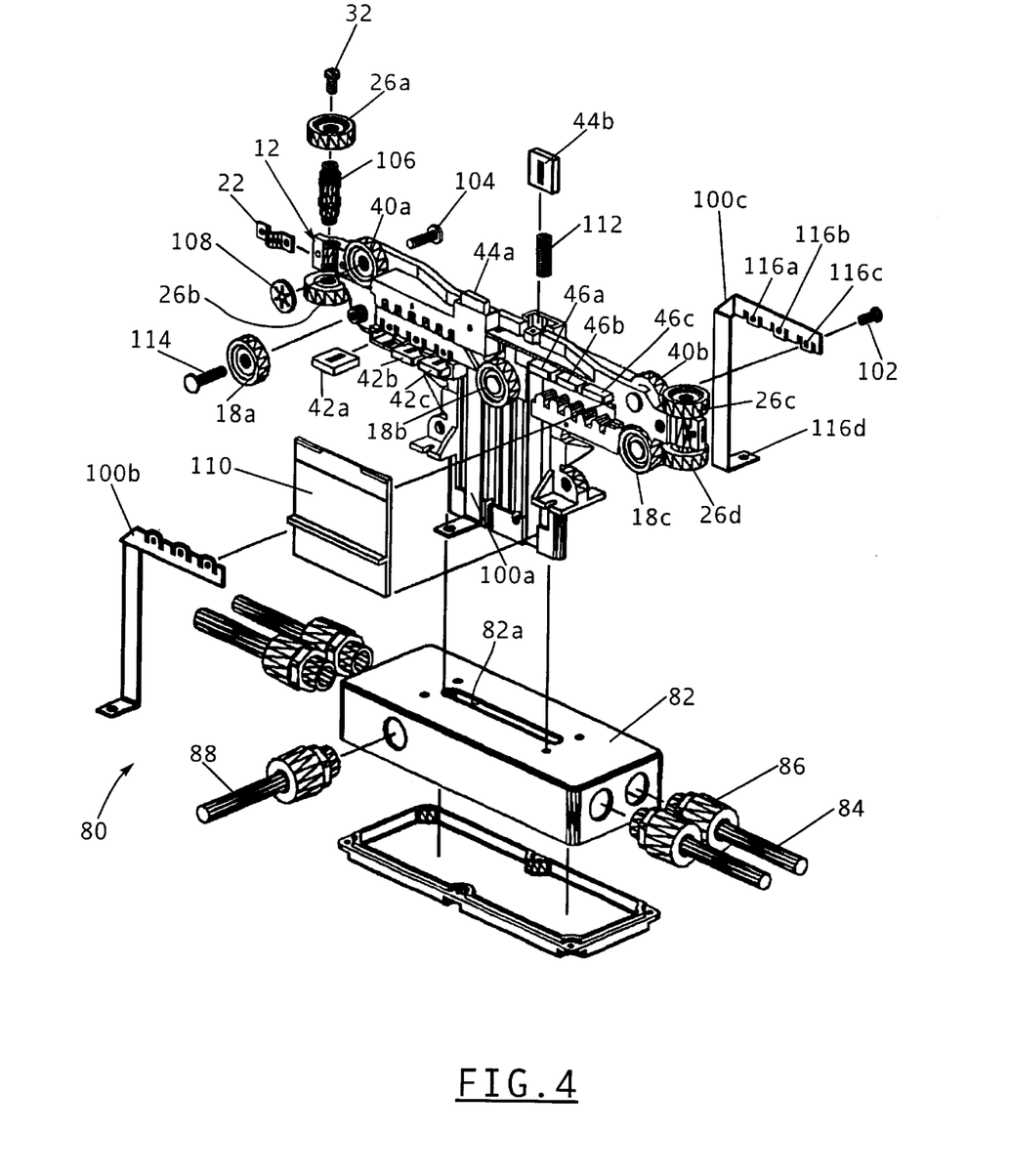
FIG. 4 is an exploded perspective of another embodiment of a trolley in accordance with the present invention.

Referring to FIG. 1, there is shown an upper perspective view of a trolley 10 for use in a multi-conductor power bar system in accordance with the present invention. Side elevation and top plan views of the inventive trolley 10 are respectively shown in FIGS. 2 and 3. FIG. 4 is an exploded perspective view of another embodiment of the trolley for use in a multi-conductor power bar system in accordance with the present invention.

Trolley 10 includes an upper body 12, an intermediate portion 14, and a lower junction box 60. The trolley body 10 is disposed within an elongated, generally closed housing having a plurality of conductive strips extending the length thereof as described below. The conductor housing of the power bar system is not shown in FIGS. 1, 2 or 3 for simplicity, but is shown in the sectional view of FIG. 5 and is described in detail below. The trolley intermediate portion 14 is disposed within and extends through a lower slot in the power bar system housing, while the junction box 60 is attached to and suspended from the trolley's intermediate portion and is disposed below the housing of the power bar system. The trolley body 12 is preferably comprised of a glass filled polyester and includes various electrically conducting components as well as support and guide wheels which are described in detail in the following paragraphs.

Figure 5:
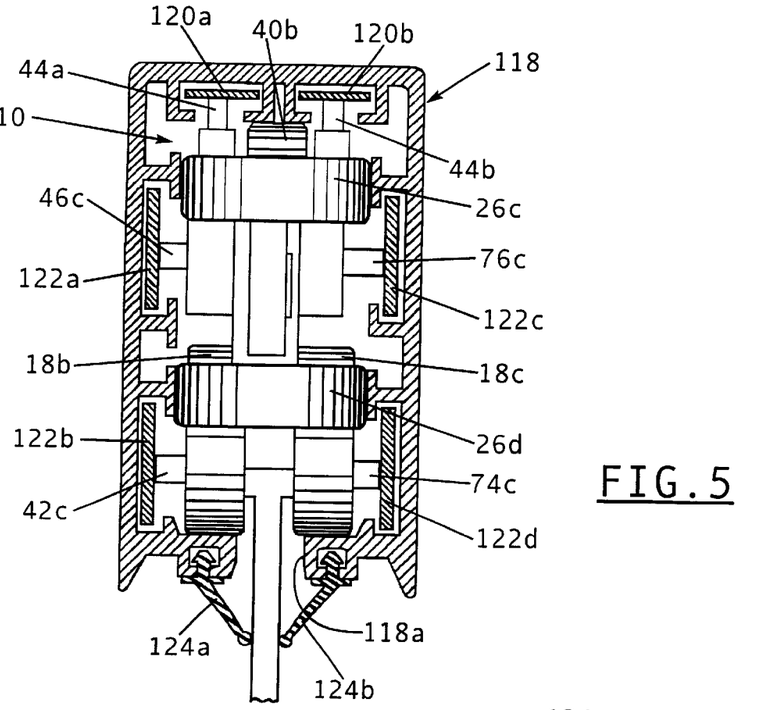
FIG. 5 is a sectional view of a trolley disposed in a multi-conductor housing in accordance with the present invention.

Trolley 10 includes six load bearing wheels which engage a lower, inner portion of the multi-conductor housing as illustrated in FIG. 5 and described in detail below. A first load bearing wheel 18a is disposed on a first end of a lower portion of the trolley 10, while a second load bearing wheel 18c is disposed on an opposed end of the trolley. Third and fourth load bearing wheels 18b and 18d are disposed near the center of the trolley body 12. Fifth and sixth load bearing wheels are also disposed on opposed ends of the trolley body 12 adjacent to and aligned with the first and second wheels 18a and 18c, respectively, but are not shown in the figures for simplicity. Each of the load bearing wheels is attached to the trolley body 12 by means of a respective wheel retaining pin 114. The six load bearing wheels distribute the trolley load evenly within the housing and provide smooth passage over expansion joints in the housing or through transfer guides.

Also disposed adjacent respective ends of the trolley 12 are first and second top guide wheels 40a and 40b. Each of the first and second top guide wheels 40a, 40b is attached to the trolley body 18 by means of a combination of a wheel retaining pin 104 and wheel retaining washer 108. The first and second top guide wheels 40a, 40b engage an upper, inner portion of the housing as shown in FIG. 5 and as described in detail below. The top guide wheels 40a,40b prevent lifting of the trolley 10 during acceleration within the housing.

Also disposed on respective ends of the trolley body 12 are first and second side guide wheels 26a and 26b and third and fourth side guide wheels 26c and 26d. Each pair of side guide wheels is coupled together by means of a respective vertical end axle 106 as shown for the case of the first and second side guide wheels 26a, 26b in FIG. 4. Wheel retaining screws 32 maintain each of the side guide wheels securely connected to a respective vertical end axle. Each vertical end axle 106 is attached to a respective end of the trolley body 12 by means of a clamp 22 which is maintained in position on the trolley body by means of a pair of screws 24. Each of the side guide wheels is free to rotate on its vertical axle while engaging lateral, inner portions of the housing to maintain the trolley aligned with the housing and reduce wear between the moving trolley and the stationary housing. The side guide wheels also provide an even pressure between the copper conducting strips within the housing and the trolley's conductive contact brushes which are described in detail in the following paragraph.

The trolley body 12 further includes four arrays of three power brushes in linear alignment. Thus, a first side of the trolley body 10 includes a first plurality of linearly aligned power brushes 42a, 42b and 42c as well as a second plurality of power brushes 46a,46b and 46c. Similarly, the opposed side of the trolley body 12 includes third and fourth pluralities of aligned power brushes 74a, 74b and 74c and 76a, 76b and 76c. Each group of three power brushes is adapted to engage a respective power conductor strip disposed within the housing as described below. Each group of three power brushes is electrically coupled to a respective power lead also as described below. Electric power is provided from four power conductor strips within the housing via the four groups of aligned trios of power brushes to four power leads which are connected to the mobile machine attached to the trolley 10 as described below.

A lower portion of the trolley body 12 includes a throat cover 14 which is attached to and extends upwardly from an upper portion of the junction box 60. The upper surface of the junction box 60 is provided with an elongated, linear slot through which a lower portion of the trolley body 12 extends for providing electrical connection between the aforementioned conductive contact brushes and the electrical leads which connect the trolley 10 to a mobile machine. Junction box 60 includes a removable cover 60a for providing access to the conductors, electrical bus bars and connections between the leads and bus bars within the junction box. Attached to the junction box 60 are a plurality of watertight connectors 66 through each of which extends a respective electrical lead. The leads connected to the junction box 60 by means of a respective watertight connector 66 include power leads 62 and control leads 64. In the embodiment of the invention described herein, four power leads 62 and two control leads 64 extend between the trolley 10 and the mobile machine to which it is connected.

Figure 2:
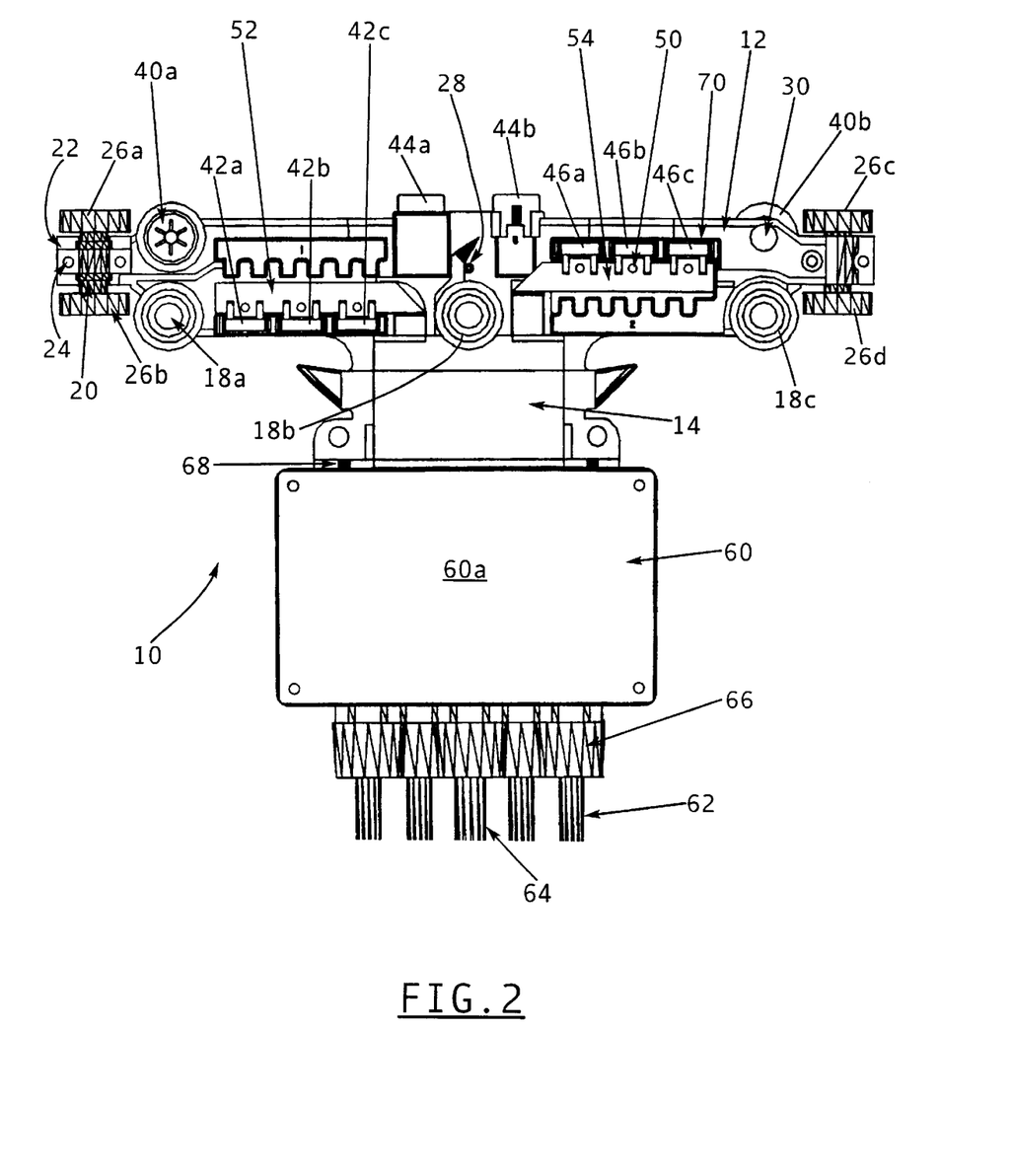
FIG. 2 is a side elevation view of the trolley shown in FIG. 1.

Referring to FIG. 4, there is shown an exploded perspective view of another embodiment of a trolley 80 in accordance with the principles of the present invention. Many of the components of trolley 80 shown in FIG. 4 are identical in function, operation and configuration as the corresponding components in the trolley 10 shown in FIGS. 1–3 and described in detail above. For those components which are identical in function, operation and configuration, the same element identifying numbers are used in FIGS. 1–3 and FIG. 4. The difference between the embodiment of trolley 80 in the exploded perspective view of FIG. 4 and the trolley 10 shown in FIGS. 1–3 is in the manner in which the electrical leads are connected to the trolley's junction box. In the embodiment shown in FIGS. 1–3, the power and control leads 62,64 are connected to a lower portion of the junction box 60 by means of a respective watertight connector 66. In the embodiment shown in FIG. 4, the power and control leads 84 and 88 are connected to lateral portions of the junction box 82 by means of respective watertight connectors 86. In this embodiment, each of the power leads 84 is an individual cable, while the control leads 88 are in the form of a two conductor cable. All of the features of the trolley 80 shown in FIG. 4 are the same as that previously described with respect to the trolley 10 shown in FIGS. 1–3. However, the exploded perspective view of FIG. 4 shows additional details of the trolley 80 illustrated in that figure and these additional details are described in the following paragraphs.

As previously described, trolley 80 includes first and second control brushes 44a and 44b. Each of the control brushes 44a,44b is disposed within a generally rectangular slot within the trolley body 12 and is urged outwardly by means of a respective coiled spring 112. The control brushes 44a, 44b allow control signals to be provided from a housing (described below) to the mobile machine. However, these control brushes 44a, 44b are optional as control of the mobile machine may be provided by an infrared signal transmission arrangement. Each of the power brushes is similarly disposed in a generally rectangular slot on the side of the trolley body 12 and is urged outwardly by a respective coil spring which are not shown in FIG. 4 for simplicity.

A lower portion of the trolley body 12 is inserted through a slot 82a in the upper surface of junction box 82. Attached to respective lateral portions of the trolley body 12 and also extending through slot 82a are four terminal bus bars, where three of the terminal bus bars are shown as elements 100a, 100b and 100c in FIG. 4. The fourth terminal bus bar is not shown in the figure for simplicity. Each of the terminal bus bars is generally L-shaped and includes three aligned upper apertures 116a, 116b and 116c and a lower aperture 116d as shown for terminal bus bar 100c. Each of the apertures is adapted to receive a mounting screw 102 for electrically connecting the terminal bus bar to an aligned set of power brushes. Thus, terminal bus bar 100b is adapted for electrical connection to power brushes 42a, 42b and 42c, while terminal bus bar 100b is electrically connected into power brushes 46a, 46b and 46c. The lower end of each of the terminal bus bars is coupled to an end of a power lead by means of a respective mounting screw inserted through a lower aperture in the terminal bus bar such as aperture 116d in terminal bus bar 100c.

FIG. 5 is a sectional view showing the trolley 10 disposed in a generally closed housing 118 having a slot 118a in a lower portion thereof and extending the length of the housing. A lower portion of the trolley 10 extends through the slot 118a in housing 118 and is engaged by first and second sealing strips 124a and 124b. Sealing strips 124a, 124b are optional and are preferably comprised of a semi-rigid material such as rubber or plastic and provide a seal for housing 118 to prevent environmental contaminants such as dust and water vapor from entering the housing and contacting the upper portion of the trolley body 12. As shown in FIG. 5, the first and second control brushes 44a, 44b respectively engage control conductor strips 120a and 120b. Similarly, three power brushes engage power conductor strip 122b, where only one power brush 42c is shown in FIG. 5, while three power brushes engage power conductor strip 122a, where only one power brush 46c is shown in FIG. 5. On the other side of the trolley body 12, three power brushes engage power conductor strip 122d, where only one power brush 74c is shown in FIG. 5, while three power brushes engage power conductor strip 122c where only one power brush 76c is shown in FIG. 5.

Figure 6:
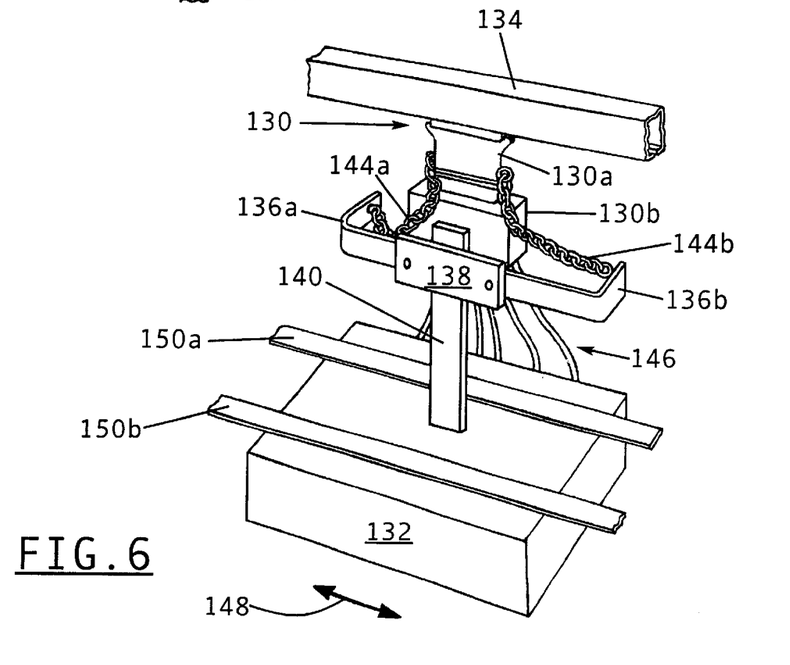
FIG. 6 is an upper perspective view showing the mechanical and electrical coupling between a trolley in accordance with the present invention and a mobile machine such as a hoist or crane.

Referring to FIG. 6, there is shown a perspective view of the manner in which a trolley 130 in accordance with the present invention is coupled to a mobile machine 132 such as a hoist or crane. The trolley 130 is suspended from an elongated, closed housing 134 and includes an intermediate portion 130a and a lower junction box 130b. Junction box 130b is connected to the mobile machine 132 by means of a connecting arm 140. Also attached to junction box 130 by means of a connecting bracket 138 are first and second tow arms 136a and 136b. The distal ends of the first and second tow arms 136a, 136b are coupled to the intermediate portion 130a of trolley 130 by means of respective first and second chains 144a and 144b. The chains 144a,144b and tow arms 136a,136b allow the mobile machine 132 to pull the trolley 130 along housing 134 without placing stress on the electrical leads 146 connecting the trolley 130 and mobile machine 132. The mobile machine 132 is supported by and travels along a pair of spaced tracks 150a and 150b in the directions of arrow 148.

There has thus been shown a multi-conductor power bar system such as used in automatic storage/retrieval systems and a trolley therefor. The trolley is adapted for positioning within and movement along a generally closed multi-conductor housing. The trolley is further electrically coupled to a mobile machine such as a hoist or crane for travel with the machine as it lifts and transports objects. The housing encloses a plurality of thin copper conducting strips and includes a slot in a lower portion of the housing which extends the length of the housing. The trolley extends through the lower slot in the housing. An upper portion of the trolley disposed within the housing includes a plurality of rollers which facilitate high speed transport of the trolley within the housing as well as over expansion joints and through transfer guides. The trolley further includes conductive contact brushes which engage respective copper conductor strips within the housing. The copper conductor strips carry electrical power as well as control signals for driving and controlling the mobile machine connected to the trolley. Each of the four power conductor strips within the housing is rated for 200 amps at 600 volts, while each of the two control conductor strips is rated for 50 amps at 150 volts. The trolley's contact brushes are rated at 15 amps at 150 volts for the control conductor strips and 100 amps at 600 volts for the power conductor strips, making it possible to handle 100 amps with only one trolley and 200 amps with two trolleys connected in parallel. Only two wires need be connected in parallel to provide a 200 amp rating using two trolleys. The conductive contact brushes which receive power are arranged in linearly aligned groups of three in contact with a common power conductor strip to provide maximum contact surface for more reliable, efficient mobile machine operation.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A multi-conductor power bar system for operating a mobile machine disposed on at least one support track, said system comprising:
   an elongated, generally closed housing having a slot extending the length thereof;
   a first plurality of thin power conductor strips disposed within and extending the length of said housing and carrying electric power signals;
   a trolley disposed in said housing and extending through the slot therein, said trolley including a first plurality of power contact brushes engaging said thin power conductor strips, wherein said power contact brushes are arranged in a plurality of linearly aligned arrays, and wherein said power contact brushes in each of said linearly aligned arrays are adapted for engaging a respective power conductor strip along a portion of the length thereof;
   a plurality of terminal bus bars disposed in said trolley, wherein each terminal bus bar is coupled to a respective linearly aligned array of power contact brushes; and
   first power leads each connected to a respective terminal bus bar for coupling a respective linearly aligned array of said power contact brushes to the mobile machine.

2. The system of claim 1 further comprising a second plurality of thin control conductor strips disposed within and extending the length of the housing and carrying control signals, a second plurality of control contact brushes each engaging a respective control conductor strip, and second control leads each coupling a respective control contact brush to the mobile machine.

3. The system of claim 2 further comprising means for urging said power and control contact brushes in intimate contact with a respective power conductor strip and control conductor strip.

4. The system of claim 3 wherein said means for urging each of said brushes in intimate contact with a respective conductor strip includes a spring.

5. The system of claim 1 wherein said trolley and said housing are comprised of impact-resistant, high strength plastic.

6. The system of claim 5 wherein said trolley is comprised of a glass-filled polyester and said housing is comprised of polyvinyl chloride.

7. The system of claim 2 wherein said housing includes a plurality of inner slots extending the length thereof, and wherein each slot is adapted to receive and support in a loose-fitting manner a respective power or control conductor strip.

8. The system of claim 7 wherein said housing further includes inner lateral slots each supporting a respective power conductor strip and two upper slots each supporting a respective control conductor strip.

9. The system of claim 8 wherein said trolley includes first and second upper control contact brushes each engaging a respective control conductor strip and pluralities of aligned lateral power contact brushes, each of said pluralities of aligned lateral power contact brushes engaging a respective power conductor strip.

10. The system of claim 9 wherein said lateral power contact brushes include four arrays of linearly aligned brushes, and wherein each array of linearly aligned brushes engages a respective power conductor strip along a portion of the length thereof.

11. The system of claim 1 wherein said trolley includes plural rollers engaging lower, upper and lateral inner portions of said housing for supporting said trolley, preventing lifting of said trolley within said housing when said trolley is accelerated, and maintaining said trolley laterally aligned with said housing.

12. The system of claim 1 further comprising seal means attached to said housing and disposed along the slot therein for preventing contaminants from entering said housing and contacting an upper portion of said trolley.

13. The system of claim 12 wherein said seal means includes first and second semi-rigid strips disposed along said slot and engaging opposed surfaces of said trolley.

14. A trolley for use in a multi-conductor power bar system for operating a mobile machine mounted to and supported by a track, said power bar system including first power conductor strips disposed in a generally closed, elongated housing, wherein said housing includes lower, upper and lateral inner portions and a slot disposed in a lower portion and extending the length thereof, said trolley comprising:
   a body having an upper portion disposed in the housing and a lower portion extending through the slot in the housing;
   plural roller means disposed on the upper portion of said body and engaging the lower, upper and lateral inner portions of the housing for supporting the trolley, preventing lifting of the trolley within the housing when the trolley is accelerated, and maintaining the trolley laterally aligned with the housing;
   first power contact brushes disposed on the upper portion of said body and arranged in a plurality of linearly aligned arrays, wherein said power contact brushes in each of said linearly aligned arrays are adapted for engaging a respective power conductor strip in the housing along a portion of the length of the power conductor strip;

a plurality of terminal bus bars disposed in said body, wherein each terminal bus bar is coupled to a respective linearly aligned array of power contact brushes; and first power leads each connected to a respective terminal bus bar for coupling a respective linearly aligned array of power contact brushes to the mobile machine.

15. The trolley of claim 14 further comprising second control brushes disposed on the upper portion of said body, wherein each control brush is adapted for engaging a respective control conductor strip in said housing, and second control leads each adapted for coupling a respective control brush to the mobile machine.

16. The trolley of claim 15 further comprising a junction box connected to and suspended from the lower portion of the trolley and coupled to said power and control leads in a sealed manner.

17. The trolley of claim 15 further comprising means for urging said power contact and control brushes into intimate contact with said power and control conductor strips, respectively.

18. The trolley of claim 17 wherein said means for urging said power contact and control brushes into intimate contact with said power and control conductor strips include a spring.

19. The trolley of claim 15 wherein said power conductor strips are rated at 200 amps at 600 volts and said control conductor strips are rated at 50 amps at 150 volts.

20. The trolley of claim 19 wherein said power contact brushes are rated at 100 amps at 600 volts and said control brushes are rated at 15 amps at 150 volts.

21. The trolley of claim 14 wherein said roller means includes lower support wheels engaging a lower, inner portion of the housing, upper guide wheels engaging an upper, inner portion of the housing for preventing lifting of the trolley, and side guide wheels engaging facing, lateral, inner portions of the housing for maintaining said trolley laterally aligned with the housing.

22. The trolley of claim 14 wherein said trolley is comprised of glass-filled polyester.

* * * * *

UNITED STATES PATENT AND TRADEMARK OFFICE
CERTIFICATE OF CORRECTION

PATENT NO.     : 6,264,017 B1
DATED          : July 24, 2001
INVENTOR(S)    : Evans It is certified that error appears in the above-identified patent and that said Letters Patent is hereby corrected as shown below:

<u>Column 4,</u>
Line 30, after "body" delete "18" and insert -- 12 --

Signed and Sealed this

Ninth Day of July, 2002

*Attest:*

*Attesting Officer*

JAMES E. ROGAN
*Director of the United States Patent and Trademark Office*